(12) United States Patent
Lanus

(10) Patent No.: US 7,373,278 B2
(45) Date of Patent: May 13, 2008

(54) METHOD OF LATENT FAULT CHECKING A COOLING MODULE

(75) Inventor: Mark S. Lanus, Tempe, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 112 days.

(21) Appl. No.: 11/336,230

(22) Filed: Jan. 20, 2006

(65) Prior Publication Data

US 2007/0174020 A1    Jul. 26, 2007

(51) Int. Cl.
*G06F 11/30* (2006.01)

(52) U.S. Cl. .................................... 702/185

(58) Field of Classification Search ............... 702/96, 702/118, 119, 122, 123, 124, 182, 183, 185; 700/300; 417/44.11
See application file for complete search history.

(56) References Cited

U.S. PATENT DOCUMENTS

| | | | | |
|---|---|---|---|---|
| 5,727,928 A | * | 3/1998 | Brown | 417/44.11 |
| 6,163,266 A | * | 12/2000 | Fasullo et al. | 340/664 |
| 2003/0084358 A1 | * | 5/2003 | Bresniker et al. | 713/324 |
| 2003/0236594 A1 | * | 12/2003 | Frankel et al. | 700/300 |
| 2005/0165577 A1 | * | 7/2005 | Fasullo et al. | 702/142 |

OTHER PUBLICATIONS

BladeCenter. [Online] Available http://www-03.ibm.com/servers/eserver/bladecenter/, Dec. 6, 2005.

* cited by examiner

*Primary Examiner*—Edward Raymond
*Assistant Examiner*—Mohamed Charioui
(74) *Attorney, Agent, or Firm*—Harness Dickey & Pierce P.L.C.

(57) ABSTRACT

A method of latent fault checking a cooling module of an embedded computer chassis may include prior to detection of an active fault in the cooling module, performing a fan controller latent fault checking algorithm and a full-speed latent fault checking algorithm. The fan controller latent fault checking algorithm may include attempting to modify a fan speed in the cooling module via a fan controller module in the cooling module, and determining if a change in the fan speed is detected. The full-speed latent fault checking algorithm may include attempting to modify the fan speed via a full speed fan control circuit, bypassing the fan controller module, and determining if the change in the fan speed is detected. If the change in the fan speed is not detected in at least one of the fan controller latent fault checking algorithm and the full-speed latent fault checking algorithm, a latent fault in the cooling module of the embedded computer chassis may be indicated.

18 Claims, 3 Drawing Sheets

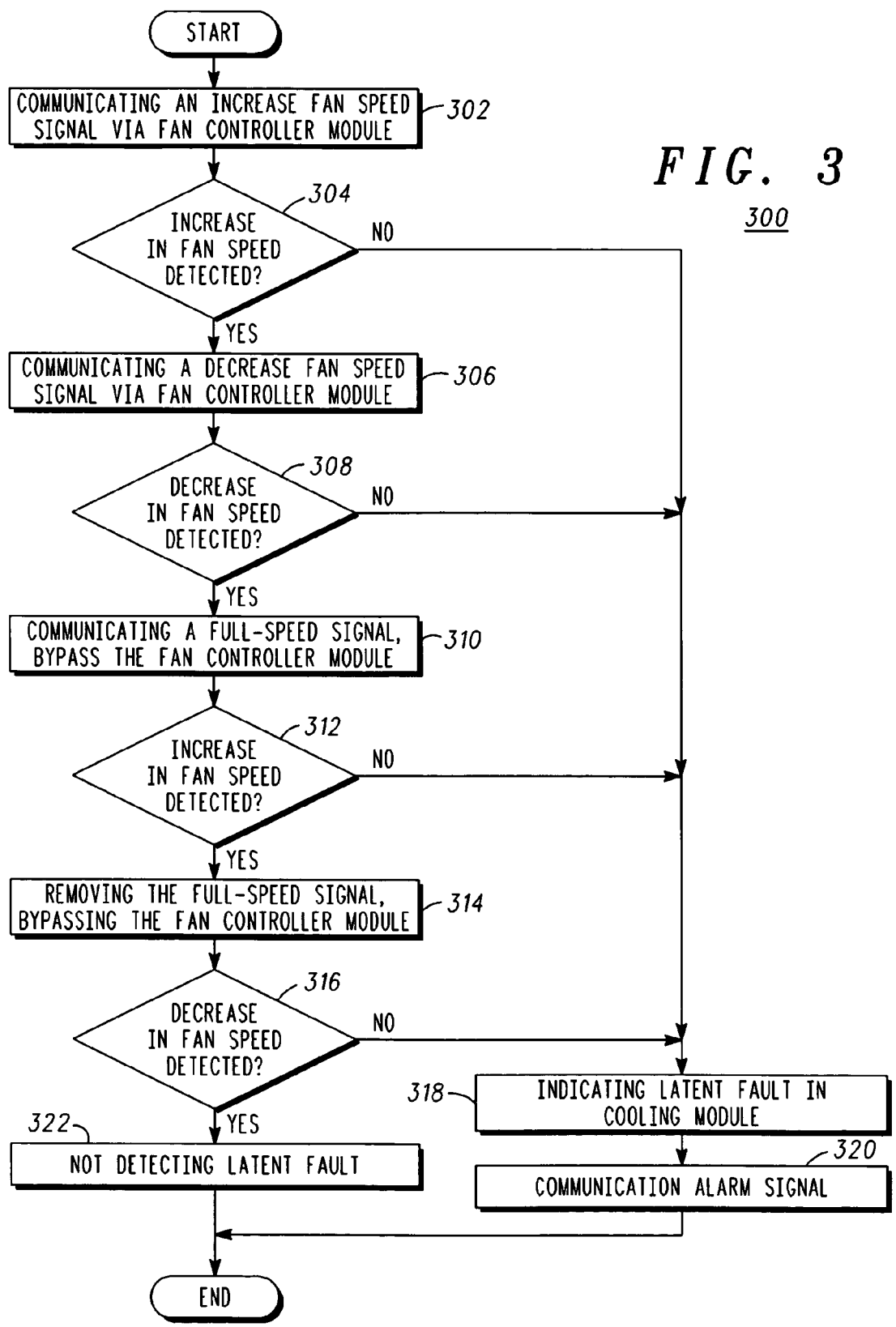

METHOD OF LATENT FAULT CHECKING A COOLING MODULE

BACKGROUND OF INVENTION

Embedded computer chassis systems generally include numerous rack-mounted computer cards connected to a backplane. The computer cards may include payload cards and switch module cards that communicate using a bus or switched fabric topology over the backplane. The payload cards and switch cards may be chosen so as to provide the computer chassis with the functionality and features desired by a user.

Each embedded computer chassis generally includes cooling modules mounted in the chassis to cool the computer cards. Most cooling modules in computer equipment implement variable speed fan control and fan tachometer monitoring to detect fan failures or imminent fan failures. However, the fan tachometer or fan controller may fail in such a way as to give a false reading indicating that the fan is alright. This is a latent fault as it is a fault that occurred but does not yet compromise the cooling subsystem. Further, if the fan or fan control then fails, the latent fault is activated and the fan tachometer provides a reading indicating that the fan is working properly when in fact the fan has failed. The prior art does not currently provide a method to detect latent faults in cooling subsystems of embedded computer systems.

There is a need, not met in the prior art, for an apparatus and method for latent fault checking a cooling module. Accordingly, there is a significant need for an apparatus that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

FIG. 3 representatively illustrates a flow diagram in accordance with an exemplary embodiment of the present invention.

Figure 1:
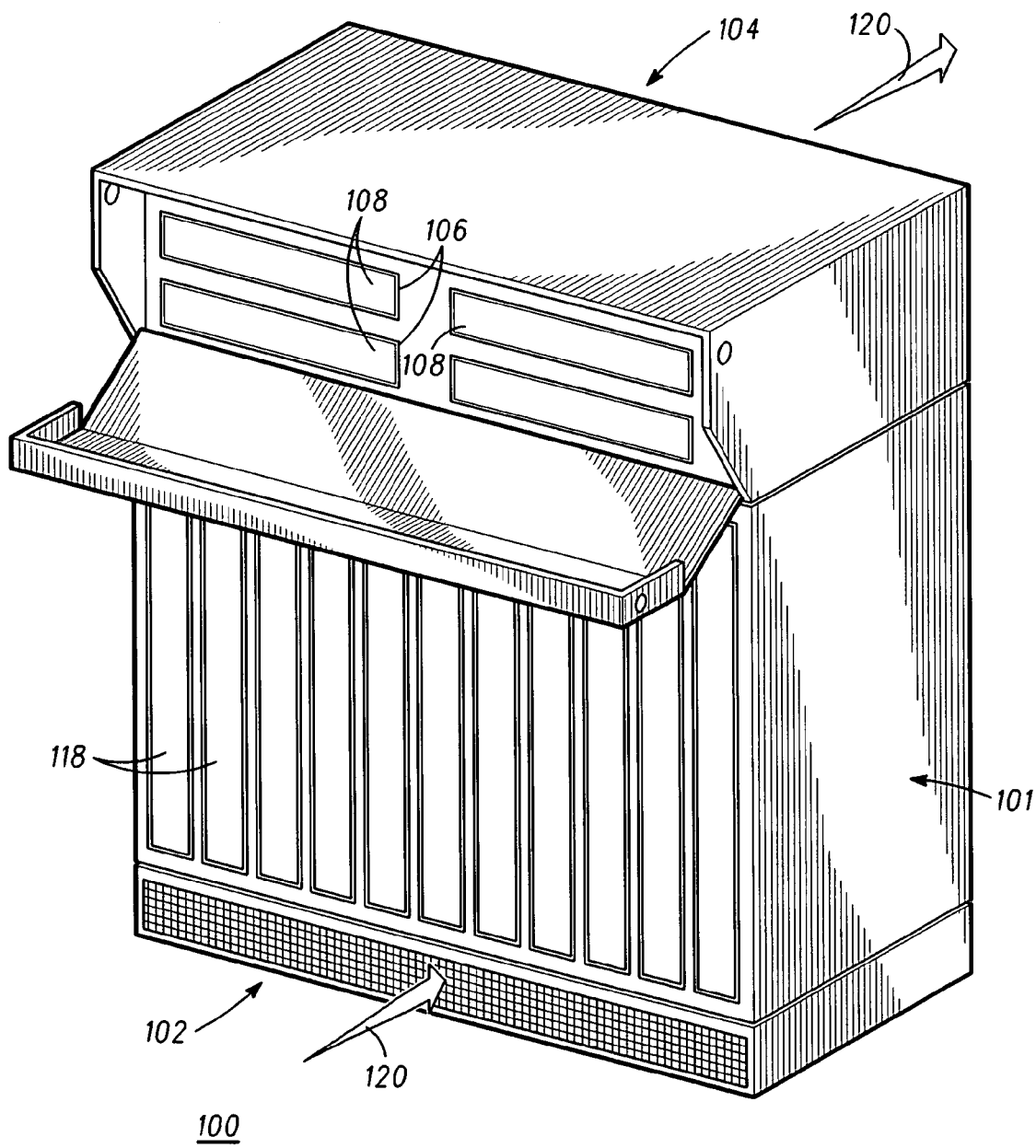
FIG. 1 representatively illustrates a computer system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

The terms "a" or "an", as used herein, are defined as one, or more than one. The term "plurality," as used herein, is defined as two, or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, an object code, a shared library/dynamic load library and/or other sequence of instructions designed for execution on a computer system. A component may include a computer program, software application, or one or more lines of computer readable processing instructions.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

A detailed description of an exemplary application is provided as a specific enabling disclosure that may be generalized to any application of the disclosed system, device and method for latent fault checking a cooling module in accordance with various embodiments of the present invention.

FIG. 1 representatively illustrates a computer system 100 in accordance with an exemplary embodiment of the present invention. Computer system 100 may include an embedded computer chassis 101 having a front side 102 and a rear side 104. In an embodiment, computer system 100 and embedded computer chassis 101 may comply with the Advanced Telecom and Computing Architecture (ATCA™) standard as defined in the PICMG 3.0 AdvancedTCA specification. In another embodiment, computer system 100 and embedded computer chassis 101 may comply with CompactPCI standard. In yet another embodiment, embedded computer chassis 101 may comply with MicroTCA standard as defined in PICMG® MicroTCA Draft 0.6—Micro Telecom Compute Architecture Base Specification (and subsequent revisions). The embodiment of the invention is not limited to a computer system complying with any of these standards, and computer systems complying with other standards are within the scope of the invention.

Embedded computer chassis 101 may include a plurality of slots for inserting computing modules 118, for example payload modules and switch modules. Computing modules 118 may couple to backplane (not shown for clarity) to facilitate power distribution and/or communication using a bus topology, switch fabric topology, and the like. In an embodiment, backplane may comprise for example and without limitation, 100-ohm differential signaling pairs. When in operation, computing modules 118 generate heat that must be removed from embedded computer chassis 101.

Computing modules 118 may comprise at least one switch module coupled to any number of payload modules via the backplane, which may accommodate any combination of a packet switched backplane including a distributed switched fabric, or a multi-drop bus type backplane. Backplanes architectures may include CompactPCI, Advanced Telecom Computing Architecture (AdvancedTCA), MicroTCA, and the like.

Payload modules may add functionality to computer system 100 through the addition of processors, memory, storage devices, I/O elements, and the like. In other words, payload module may include any combination of processors, memory, storage devices, I/O elements, and the like, to give computer system 100 any functionality desired by a user.

In an embodiment, computer system 100 can use switch module as a central switching hub with any number of payload modules coupled to one or more switch modules. Computer system 100 may support a point-to-point, switched input/output (I/O) fabric. Computer system 100 may be implemented by using one or more of a plurality of switched fabric network standards, for example and without limitation, InfiniBand™, Serial RapidIO™, Ethernet™, AdvancedTCA™, PCI Express™, Gigabit Ethernet, and the like. Computer system 100 is not limited to the use of these switched fabric network standards and the use of any switched fabric network standard is within the scope of the invention.

In an embodiment, embedded computer chassis 101 may include a cooling subsystem comprising any number of cooling modules 108 for dissipating heat generated by computing modules 118, temperature sensors and other hardware and software modules to detect and react to temperature changes in embedded computer chassis. In a particular embodiment, and not limiting of the invention, cooling module 108 may be disposed adjacent to computing modules 118. Embedded computer chassis 101 may include a plurality of fan module bays 106, each disposed to accept a cooling module 108 for drawing cooling air 120 through embedded computer chassis 101. In an embodiment, each cooling module 108 may include one or more fans or blowers, power and control circuitry, and the like (as discussed more fully below). Cooling module 108 may plug into each fan module bay 106 and receive power from a central or dedicated power supply for embedded computer chassis 101. In an embodiment, embedded computer chassis 101 may include a cooling module cover 110 to provide access to cooling module for maintenance and system diagnostics. In the following discussion of embodiments, term "fan" or "fans" will be understood to include "blowers," "fans," or any combination of "blowers" and "fans."

Figure 2:
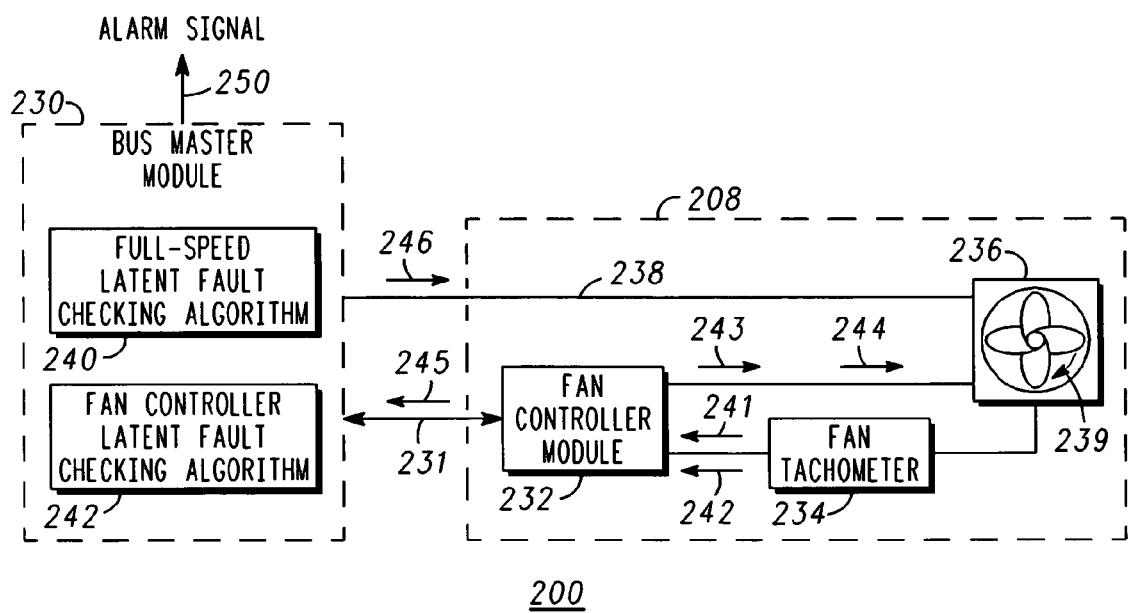
FIG. 2 representatively illustrates a computer system in accordance with another exemplary embodiment of the present invention.

FIG. 2 representatively illustrates a computer system 200 in accordance with another exemplary embodiment of the present invention. In an embodiment, computer system 200 may include cooling module 208 coupled to at least one bus master module 230. Cooling module 208 may be a modular cooling fan tray coupled for insertion into fan module bays 106, and include one or more fans 236, and a fan controller module 232 coupled to issue commands to the fan such as increase speed, decrease speed, on/off signals, and the like. Cooling module 208 may also include a fan tachometer 234 coupled to read the fan speed 239 in rpm, and the like, and report the fan speed 239 to fan controller module 232, which may then report fan speed 239 to bus master module 230.

Coupled to cooling module 208, is a bus master module 230, which may function to control a maintenance bus 231. In an embodiment, maintenance bus 231 may communicate management data between bus master module 230 and cooling module 208. Management data may include data pertaining to, for example and without limitation, temperature, voltage, amperage, bus traffic, status indications, and the like. Management data may also include instructions, for example and without limitation, instructions for cooling fans, adjustment of power supplies, and the like. Management data communicated over maintenance bus 231 may function to monitor and maintain cooling module 208. Management data differs from other data transmitted on a data bus (not shown for clarity) in that management data is used for monitoring and maintaining, among other things, cooling module 208, while a traditional data bus functions to communicate data transmitted to/from and processed by computing modules 118.

In an embodiment, maintenance bus 231 may be an Intelligent Platform Management Bus (IPMB) as specified in an Intelligent Platform Management Interface Specification. The Intelligent Platform Management Bus may be an $I^2C$-based bus that provides a standardized interconnection between different boards within a chassis. The IPMB can also serve as a standardized interface for auxiliary or emergency management add-in cards. In an embodiment, bus master module 230 may be a Shelf Management Controller (ShMC) as is know in the AdvancedTCA computer platform.

Under normal operation, fan controller module 232 controls the fan speed 239 based on cooling requirements of embedded computer chassis 101. For example, if bus master module 230 detects a temperature increase in embedded computer chassis 101, it may signal cooling module 208, particularly fan controller module 232, that it needs to increase the fan speed 239 to increase cooling air flow. If the system is functioning correctly, fan controller module 232 may issue a command to fan 236 to increase fan speed 239. This increase in fan speed is detected by fan controller module 232 via fan tachometer 234, which may measure and report the rpm of fan 236 to bus master module 230 via fan controller module on maintenance bus 231. The same process may work in reverse if bus master module 230 detects that the temperature of embedded computer chassis 101 is too low. In this instance a decrease in fan speed may be commanded with the corresponding feedback of fan speed via fan tachometer 234.

Since cooling module 208 is critical to reliable operation of computer system 200, full-speed fan control circuit 238 is included such that bus master module 230 may order fan 236 to increase to full-speed, while bypassing maintenance bus 231 and fan controller module 232. For example, if an increase in cooling air is required and bus master module 230 orders an increase in fan speed 239 and no indication of the increased fan speed is given via the feedback mechanism illustrated above, bus master module 230 has an alternative path to order an increase in fan speed 239. This may indicate a failure of fan controller module 232. In this instance, bus master module 230 may directly command fan 236 to increase to full speed by issuing full-speed signal 246, thereby causing fan 236 to increase to full-speed and provide maximum cooling. This feature adds an additional layer of fault tolerance to cooling module 208 and hence increases reliability.

Despite the above features, the prior art does not currently provide a method or apparatus to detect a latent fault in cooling module 208. A latent fault is a fault that has occurred but is not visible or has not manifested itself. This is contrasted with an active fault that is visible and has manifested itself. In the prior art, if fan tachometer 234 or fan controller module 232 fails such that fan speed 239 is indicated as sufficient regardless of what fan speed 239 or the condition of fan 236 really was (voltage or current draw, and the like), there may be no indication to bus master module 230 that a problem exists. This is referred to as a latent fault as it is a failure of the cooling module 208 but does not trigger an indication of failure until a second fault occurs, (such as insufficient cooling of embedded computer chassis 101).

In other words, a latent fault is a fault that is present but not visible or active. In order to maintain a highly reliable, highly available system, a latent fault within the cooling module 208 needs to be detected before a second fault occurs and activates the latent fault to the status of active fault. This may be the function of fan controller latent fault checking algorithm 242 and full-speed latent fault checking algorithm 240, which may be any combination of software or hardware functioning to detect a latent fault in cooling module 208 prior to that latent fault manifesting itself as an active fault.

Fan controller latent fault checking algorithm 242 may function to test fan controller module 232, full-speed fan control circuit 238 and fan tachometer 234 prior to an active fault in cooling module 208. Prior to an active fault in cooling module 208, or detection of an active fault in cooling module 208, fan controller latent fault checking algorithm 242 may be utilized periodically to increase the reliability of cooling module 208 and cooling subsystem.

Fan controller latent fault checking algorithm 242 attempts to modify fan speed 239 via fan controller module 232 and detect the a change in fan speed 245 at bus master module 230 to determine if fan controller module 232 and fan tachometer 234 are functioning properly. For example, an increase fan speed signal 243 may be communicated from bus master module 230 via fan controller module 232 to increase fan speed 239. It is determined if an increase in fan speed 241 is detected as measured via fan tachometer 234. Also, a decrease fan speed signal 244 may be communicated from bus master module 230 via fan controller module 232 to decrease fan speed 239. It is determined if a decrease in fan speed 242 is detected as measured via fan tachometer 234. If either the increase in fan speed 241 or the decrease in fan speed 242 are not detected, a latent fault may be indicated in the cooling module 208. In an embodiment, an alarm signal 250 may be generated to notify a system administrator of the latent fault.

To further test for latent faults in cooling module 208, full-speed latent fault checking algorithm 240 may be employed. Full-speed latent fault checking algorithm 240 attempts to modify fan speed 239 via full-speed fan control circuit 238, bypassing fan controller module 232 and detect the a change in fan speed 245 at bus master module 230 to determine if full-speed fan control circuit 238, fan controller module 232 and fan tachometer 234 are functioning properly. For example, full-speed signal 246 is communicated to fan 236 via full-speed fan control circuit 238, bypassing fan controller module 232. It is determined if an increase in fan speed 241 is detected as measured via fan tachometer 234. Removal of full-speed signal 246 while bypassing the fan controller module 232 may then allow a decrease in fan speed 239, for example back to the fan speed prior to implementing the above algorithm. It is determined if a decrease in fan speed 242 is detected as measured via fan tachometer 234. If either the increase in fan speed 241 or the decrease in fan speed 242 are not detected, a latent fault may be indicated in the cooling module 208. In an embodiment, an alarm signal 250 may be generated to notify a system administrator of the latent fault.

The above algorithms may be performed in any order and be within the scope of the invention. Further, the test of increased and decreased fan speed may be performed in any order in both algorithms and be within the scope of the invention.

FIG. 3 representatively illustrates a flow diagram 300 in accordance with an exemplary embodiment of the present invention. In step 302, an increase fan speed signal is communicated via fan controller module. In step 304 it is determined if fan speed has increased. If not, a latent fault is indicated per step 318. If fan speed has increased, a decrease fan speed signal is communicated via fan controller module in step 306. In step 308 it is determined if fan speed has decreased. If not, a latent fault is indicated per step 318.

If fan speed has decreased in step 308, a full-speed signal is communicated, bypassing fan controller module per step 310. In step 312 it is determined if fan speed has increased. If not, a latent fault is indicated per step 318. If fan speed has increased, full-speed signal is removed while bypassing fan controller module per step 314. In step 316 it is determined if fan speed has decreased. If not, a latent fault is indicated per step 318. If fan speed has decreased per step 316, no latent fault is detected per step 322. If at any point in the flow diagram latent fault is detected per step 318, an alarm signal may be generated per step 320 to notify a system administrator of the latent fault.

In the foregoing specification, the invention has been described with reference to specific exemplary embodiments. However, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A method of latent fault checking a cooling module of an embedded computer chassis, comprising:
  prior to detection of an active fault in the cooling module, performing a fan controller latent fault checking algorithm and a full-speed latent fault checking algorithm, the fan controller latent fault checking algorithm comprising:
    communicating a signal to modify a fan speed in the cooling module via a fan controller module in the cooling module;
    determining if a change in the fan speed is detected;
    the full-speed latent fault checking algorithm comprising:
    communicating a signal to modify the fan speed via a full speed fan control circuit, bypassing the fan controller module;
    determining if the change in the fan speed is detected; and
  if the change in the fan speed is not detected in at least one of the fan controller latent fault checking algorithm and the full-speed latent fault checking algorithm, indicating a latent fault in the cooling module of the embedded computer chassis.

2. The method of claim 1, the fan controller latent fault checking algorithm further comprising:
  communicating an increase fan speed signal;
  determining if an increase in the fan speed is detected;
  communicating a decrease fan speed signal;
  determining if a decrease in the fan speed is detected; and
  if at least one of the increase in the fan speed and the decrease in the fan speed are not detected, indicating the latent fault in the cooling module of the embedded computer chassis.

3. The method of claim 2, wherein a bus master module commanding the fan controller module to modify the fan speed.

4. The method of claim 3, wherein the bus master module commanding the fan controller module via an Intelligent Platform Management Bus (IPMB).

5. The method of claim 1, the full-speed latent fault checking algorithm further comprising:
  communicating a full-speed signal, bypassing the fan controller module;
  determining if an increase in the fan speed is detected;
  removing the full-speed signal, bypassing the fan controller module;
  determining if a decrease in the fan speed is detected; and
  if at least one of the increase in the fan speed and the decrease in the fan speed are not detected, indicating the latent fault in the cooling module of the embedded computer chassis.

6. The method of claim 5, wherein a bus master module applying a full-speed signal to increase the fan speed to full-speed, bypassing the fan controller module.

7. The method of claim 5, wherein a bus master module removing a full-speed signal to decrease the fan speed, bypassing the fan controller module.

8. The method of claim 1, wherein detecting the change in fan speed comprises a fan tachometer detecting the fan speed.

9. The method of claim 1, wherein indicating a latent fault comprises communicating an alarm signal.

10. An embedded computer chassis, comprising:
  a cooling module operable to cool the embedded computer chassis;
  a bus master module coupled to the cooling module, wherein prior to detection of an active fault in the cooling module, the bus master module performing a fan controller latent fault checking algorithm and a full-speed latent fault checking algorithm, the fan controller latent fault checking algorithm comprising:
    communicating a signal to modify a fan speed in the cooling module via a fan controller module in the cooling module;
    determining if a change in the fan speed is detected;
  the full-speed latent fault checking algorithm comprising:
    communicating a signal to modify the fan speed via a full speed fan control circuit, bypassing the fan controller module;
    determining if the change in the fan speed is detected; and
  if the change in the fan speed is not detected in at least one of the fan controller latent fault checking algorithm and the full-speed latent fault checking algorithm, a latent fault in the cooling module of the embedded computer chassis is indicated.

11. The embedded computer chassis of claim 10, the fan controller latent fault checking algorithm further comprising:
  communicating an increase fan speed signal;
  determining if an increase in the fan speed is detected;
  communicating a decrease fan speed signal;
  determining if a decrease in the fan speed is detected; and
  if at least one of the increase in the fan speed and the decrease in the fan speed are not detected, the latent fault in the cooling module of the embedded computer chassis is indicated.

12. The embedded computer chassis of claim 11, wherein the bus master module commands the fan controller module to modify the fan speed.

13. The embedded computer chassis of claim 12, wherein the bus master module commands the fan controller module via an Intelligent Platform Management Bus (IPMB).

14. The embedded computer chassis of claim 10, the full-speed latent fault checking algorithm further comprising:
  communicating a full-speed signal, bypassing the fan controller module;

determining if an increase in the fan speed is detected;

removing the full-speed signal, bypassing the fan controller module;

determining if a decrease in the fan speed is detected; and if at least one of the increase in the fan speed and the decrease in the fan speed are not detected, the latent fault in the cooling module of the embedded computer chassis is indicated.

15. The embedded computer chassis of claim 14, wherein the bus master module applies a full-speed signal to increase the fan speed to full-speed, bypassing the fan controller module.

16. The embedded computer chassis of claim 14, wherein the bus master module removes a full-speed signal to decrease the fan speed, bypassing the fan controller module.

17. The embedded computer chassis of claim 10, wherein the change in fan speed is detected by a fan tachometer.

18. The embedded computer chassis of claim 10, wherein when a latent fault is detected an alarm signal is communicated.

* * * * *